United States Patent [19]
Kodaira et al.

[11] Patent Number: 5,892,998
[45] Date of Patent: Apr. 6, 1999

[54] CAMERA

[75] Inventors: Takanori Kodaira; Hiroyuki Hase; Shoji Ichimasa; Kenji Ito, all of Kanagawa-ken, Japan

[73] Assignee: Canon Kabushiki Kaisha, Tokyo, Japan

[21] Appl. No.: 916,727

[22] Filed: Aug. 18, 1997

Related U.S. Application Data

[63] Continuation of Ser. No. 514,061, Aug. 11, 1995, abandoned, which is a continuation of Ser. No. 353,158, Dec. 9, 1994, abandoned, which is a continuation of Ser. No. 87,930, Jul. 6, 1993, abandoned.

[30] Foreign Application Priority Data

| Jul. 8, 1992 | [JP] | Japan | 4-181034 |
| Jul. 13, 1992 | [JP] | Japan | 4-185489 |

[51] Int. Cl.$^6$ .............. G03B 9/26; G03B 17/04
[52] U.S. Cl. .................. 396/448; 396/134
[58] Field of Search ............. 396/134, 348, 396/349, 448, 505

[56] References Cited

U.S. PATENT DOCUMENTS

| 4,864,338 | 9/1989 | Wakabayashi | 396/134 |
| 4,989,027 | 1/1991 | Ishii et al. | 354/253 |
| 5,051,765 | 9/1991 | Yoshizaki et al. | 354/187 |
| 5,159,372 | 10/1992 | Nomura et al. | 354/253 |
| 5,214,462 | 5/1993 | Haraguchi et al. | 354/187 |

Primary Examiner—Eddie C. Lee
Assistant Examiner—Michael Dalakis
Attorney, Agent, or Firm—Robin, Blecker & Daley

[57] ABSTRACT

A camera includes a movable lens barrel arranged to be moved by a driving force of a drive source, a barrier arranged to be shiftable between a closed state and an open state on a locus of movement of the movable lens barrel, a control part arranged to cause the movable lens barrel to be forcibly moved from an initial position to a predetermined position in response to an operation to open the barrier, and a blocking part arranged to allow the movement of the movable lens barrel from the initial position to the predetermined position when the barrier is open, and to block the movement of the movable lens barrel from the initial position to the predetermined position when the barrier is not open.

7 Claims, 14 Drawing Sheets

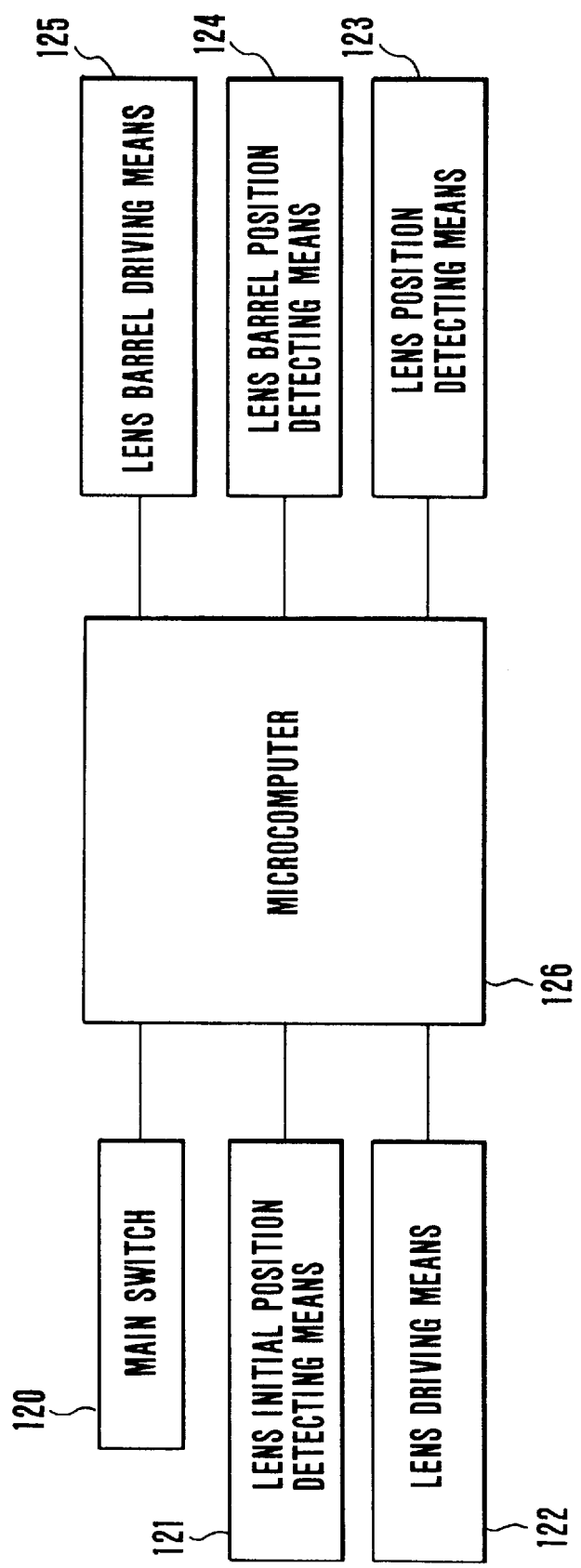
F I G. 13

CAMERA

This is a continuation application under 37 CFR 1.62 of prior application Ser. No. 08/514,061 (abandoned); filed Aug. 11, 1995, which is a continuation of Ser. No. 08/353, 158, filed Dec. 9, 1994 (abandoned); which is a continuation of Ser. No. 08/087,930, filed Jul. 6, 1993 (abandoned).

BACKGROUND OF THE INVENTION

1. Field of the Invention

This invention relates to a camera having a barrier which can be opened and closed as desired.

2. Description of the Related Art

Cameras of the kind having a barrier arranged to be opened and closed by utilizing a retracting stroke of a lens barrel have presented a problem in that the barrier cannot be fully opened in the event of intrusion of some foreign matter in between the barrier and a cover which covers the barrier. However, even in that event, a shutter release is allowed to be made, to give a blank picture, because no checking means has been provided against such a trouble.

To solve this problem by detecting the abnormality of the barrier, a barrier-abnormality sensing mechanism has been proposed as disclosed in Japanese Laid-Open Patent Application No. HEI 2-310551. This mechanism has a member moving in association with the barrier and is arranged to detect the abnormality of the barrier by causing the member to move into the range of drawing-out movement of a lens unit and, if the barrier inadequately opens, to prevent the lens unit from being drawn out for a focusing action at the time of photographing.

The above-stated solution of the problem makes a check for an abnormality of the barrier through the focusing action to be performed in photographing. Hence, the abnormality of the barrier cannot be detected prior to photographing. According to this prior art arrangement, therefore, a shutter opportunity might be missed. Another shortcoming of the prior art arrangement lies in that an amount to which the lens unit is drawn out for focusing varies with a distance from the camera to an object to be photographed (object distance). Therefore, depending on the object distance, an in-focus state might be attained before the member interlocked with the barrier comes to interfere with the lens unit. In such a case, it is impossible to detect the abnormality of the barrier.

Further, in a conventional camera having a movable lens barrel and a barrier, either a picture would be able to be taken while the barrier is in a closed state, or photographing would be inhibited although the movable lens barrel is in a photo-taking position if the barrier is closed.

Among compact cameras, the number of cameras provided with zoom lenses has greatly increased of late. In the compact camera equipped with a zoom lens, the volume ratio of a lens part to a camera body is great. In designing such a compact camera, therefore, it is important not only to minimize the size of the compact camera in its operating state but also to minimize the volume of the compact camera in its lens-retracted state. Therefore, the compact camera must be designed to reduce spaces left between lens parts within the camera body when the zoom lens is retracted, by leaving no void space for stowing the zoom lens and by minimizing spaces between other component parts. Meanwhile, in the field of single-lens reflex cameras, a viewfinder system is generally arranged to have a photographic optical path reflected on its way at the time of non-exposure so as to make the rays of light directly viewable through a separate optical path. In this instance, it is generally practiced to employ a pentagonal roof prism as an optical system for making the object image into a non-inverted erecting image. The pentagonal roof prism is arranged to receive, at its bottom entrance face, a light flux of the object image formed on a viewfinder screen and passing through the viewfinder screen and to transmit the light flux of the object image. The thus transmitted light is laterally inverted by the roof surfaces of the prism so as to be reflected obliquely downward toward the front side. The thus reflected light is reflected toward the rear side by a front reflecting surface of the prism. The thus reflected light is allowed to be projected from a rear exit surface of the prism toward an eyepiece. The use of such a pentagonal roof prism allows the light flux passing through a photo-taking lens to be directly viewable when the camera is not in process of an exposure. Therefore, a viewfinder light flux is identical with a photo-taking light flux. Accordingly, the use of the pentagonal roof prism obviates the necessity of parallax correction even in a case where a zoom lens of a high magnifying power is employed.

However, since the shape of a movable lens barrel is large at present, even if a pentagonal roof prism is employed, it is impossible to arrange the pentagonal roof prism near to a photo-taking optical axis. Hence, at present, almost no camera is using the pentagonal roof prism in combination with the movable lens barrel.

As mentioned above, a camera of the kind having the movable lens barrel and the barrier has presented such a problem that a picture believed to have been taken might turn out to be not taken or that no picture might be taken to miss a shutter opportunity although the movable lens barrel is in a photographing position.

Meanwhile, in reducing the size of a camera of the kind using a pentagonal roof prism as a viewfinder optical system, the position of the pentagonal roof prism must be lowered and arranged as close as possible to a photo-taking optical axis. If the pentagonal roof prism is arranged too close to the optical axis, however, the size of the lens barrel of the camera must be reduced to a greater extent. However, an extent to which the position of the pentagonal roof prism can be lowered greatly depends on the outside diameter of the lens barrel. As a result, the possible extent of reduction in size of the camera depends on the size of the lens barrel.

Further, almost every camera is provided with a small-sized built-in flash device these days. Even if the size of the built-in flash device is minimized to reduce the size of the camera as a whole, the employment of the built-in flash device inevitably increases the size of the camera in its non-operating state.

SUMMARY OF THE INVENTION

It is one aspect of this invention to provide a camera which is of the above-stated kind having a movable lens barrel and a barrier and is capable of accurately detecting any inadequate opening of the barrier by forcibly drawing out the movable lens barrel for the purpose of detecting inadequacy of opening of the barrier and by deciding the opening of the barrier to be normal if the movable lens barrel can be drawn out to a specific position or to be abnormal if the movable lens barrel fails to reach the specific position.

It is another aspect of this invention to provide a camera of the above-stated kind, which is arranged to detect an open or closed state of the barrier and, if the barrier is detected to be in the closed state, to promptly inform a photographer of the abnormality of the camera by retracting the movable lens barrel, so that the photographer can be saved from taking a bad picture.

It is a further aspect of this invention to provide a camera which is arranged to use a foldable pentagonal roof prism and to utilize a space obtained by folding the pentagonal roof prism either for stowing a movable lens barrel to be retracted or for stowing a flash unit.

These and further aspects or objects and features of this invention will become apparent from the following detailed description of embodiments thereof taken in connection with the accompanying drawings.

BRIEF DESCRIPTION OF THE DRAWINGS

FIG. 13 is a block diagram showing the electric circuit of the camera of FIG. 9.

DETAILED DESCRIPTION OF THE PREFERRED EMBODIMENTS

Figure 1A:
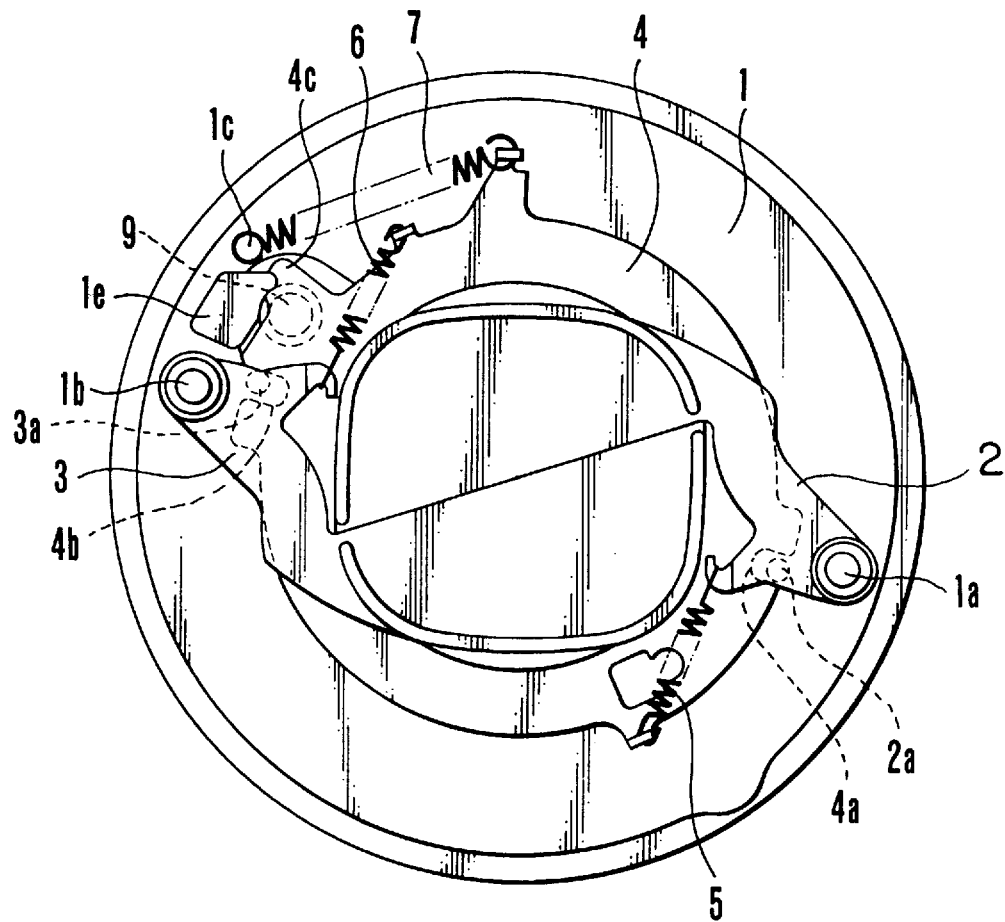
FIGS. 1(A) and 1(B) show a barrier opening and closing mechanism in a state of completely closing a barrier of a camera which is arranged according to a first embodiment of this invention.
Figure 1B:
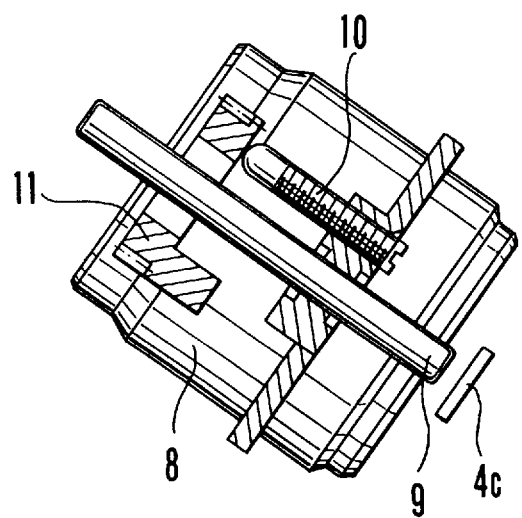
Figure 2A:
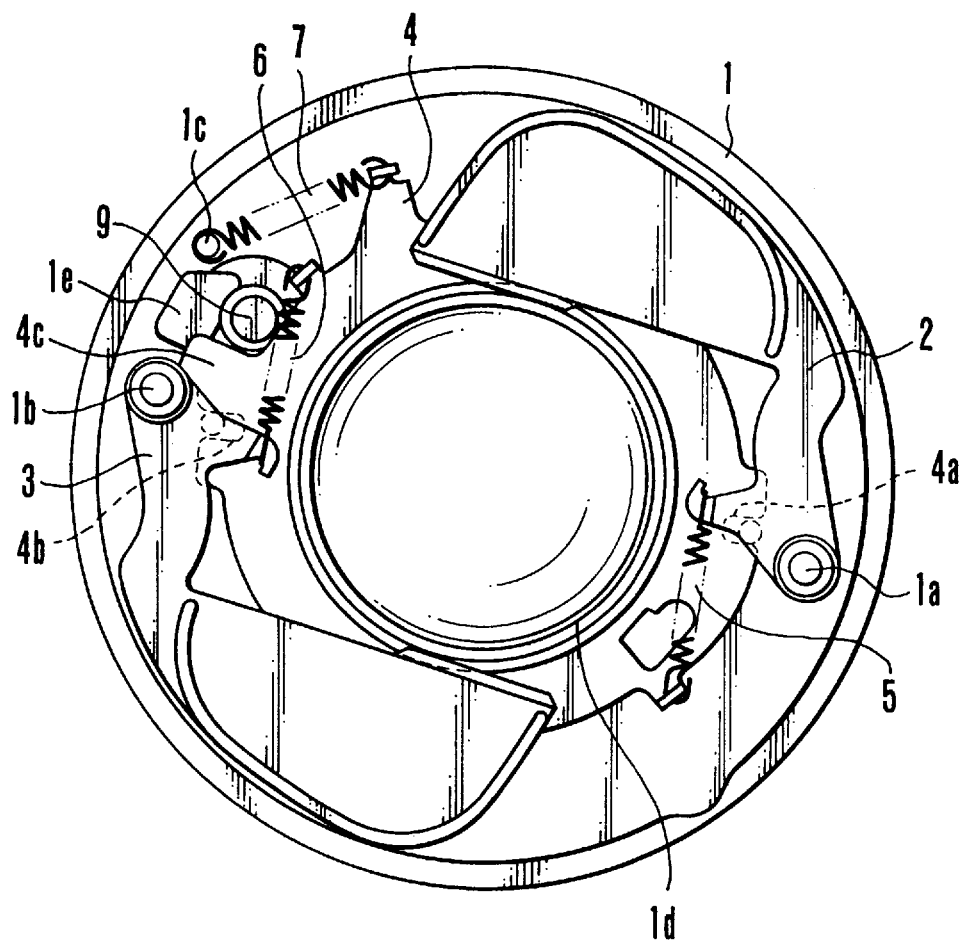
FIGS. 2(A) and 2(B) show the barrier of the first embodiment in a fully open state.
Figure 2B:
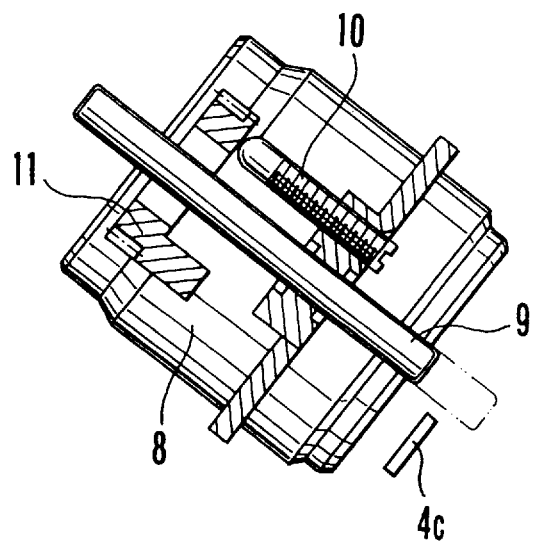
Figure 3A:
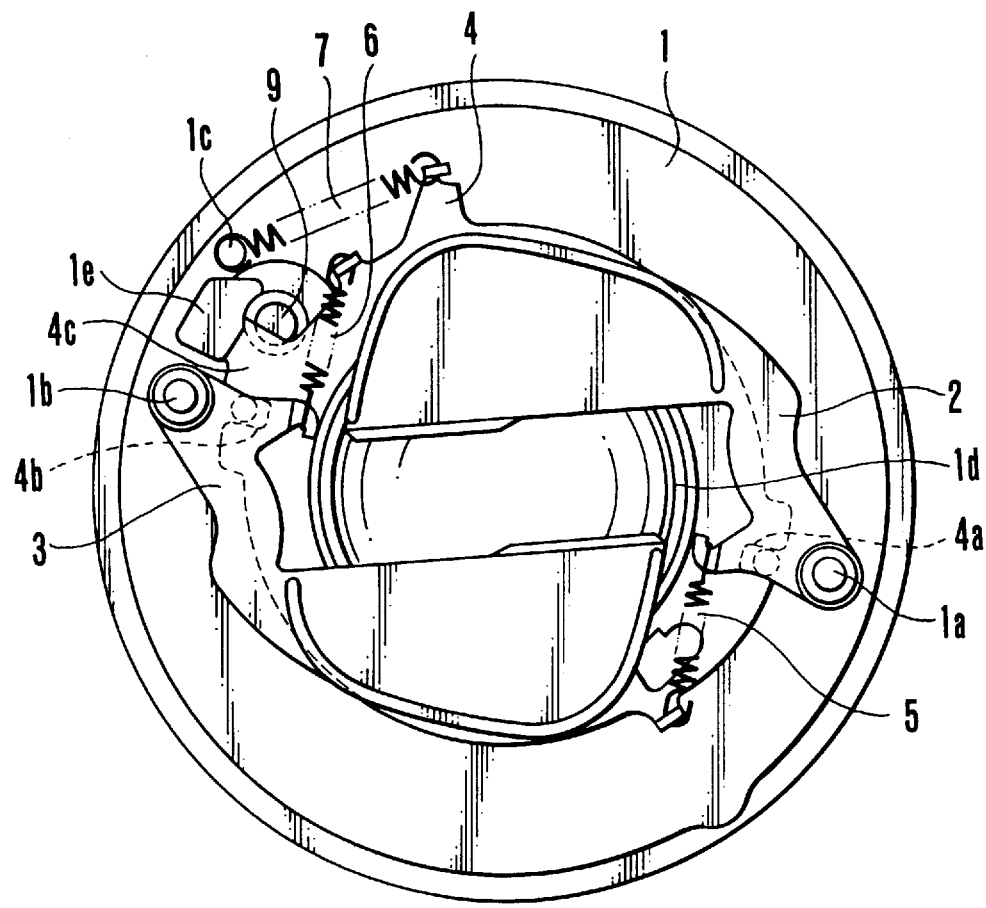
FIGS. 3(A) and 3(B) show the barrier of the first embodiment in a state obtained in the middle of an opening or closing process.
Figure 3B:
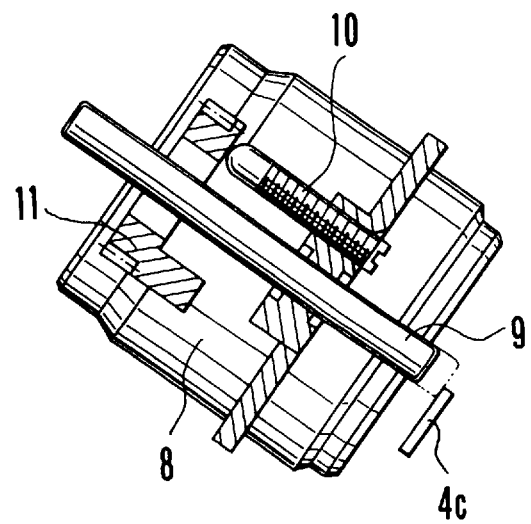

FIGS. 1(A) and 1(B) to FIGS. 3(A) to 3(B) show a first embodiment of this invention. FIGS. 1(A) and 1(B) are a plan view and a sectional view, respectively, showing a barrier in a closed state. FIGS. 2(A) and 2(B) are a plan view and a sectional view, respectively, showing the barrier in an open state. FIGS. 3(A) and 3(B) are a plan view and a sectional view, respectively, showing the barrier in a state obtained in the middle of a barrier opening or closing process. The first embodiment is described with reference to these drawings as follows: A lens barrel frame 1 contains therein a photo-taking optical system which is not shown. Barrier pieces 2 and 3 which are provided for protecting the photo-taking optical system are swingably fitted on dowels 1a and 1b provided on the lens barrel frame 1. In FIG. 1(A), the barrier pieces 2 and 3 are shown in a state of covering a photo-taking aperture 1d (see FIG. 2(A)) of the lens barrel frame 1. A driving ring 4 which is rotatable around the aperture 1d is disposed between the lens barrel frame 1 and the barrier pieces 2 and 3. The barrier pieces 2 and 3 are provided with dowels 2a and 3a which are respectively fitted into slot parts 4a and 4b of the driving ring 4. When the driving ring 4 rotates counterclockwise, the barrier pieces 2 and 3 respectively swing in the direction of retreating away from the front of the aperture 1d of the lens barrel frame 1. Springs 5 and 6 are respectively hung between the driving ring 4 and the barrier pieces 2 and 3 in such a way as to eliminate rattling of fitted engagement by pushing and causing the dowels 2a and 3a to always abut on one side wall of each of the slots 4a and 4b. A spring 7 is hung between the driving ring 4 and a dowel 1c of the lens barrel frame 1 so as to urge the driving ring 4 to rotate counterclockwise. Barrier driving means which is not shown is connected to the driving ring 4. The driving ring 4 is thus arranged to be rotated in association with turning on or off of a main switch of the camera of this embodiment. With the driving ring 4 thus rotated, the barrier pieces 2 and 3 are opened or closed accordingly. The barrier driving means is arranged in a known manner and is, therefore, omitted from description.

FIGS. 1(B), 2(B) and 3(B) are sectional views showing the internal arrangement of the lens barrel frame 1. Referring to these drawings, a lens barrel unit 8 is arranged to carry a photo-taking lens which is not shown. A straight-travel guide bar 9 is secured to the lens barrel unit 8. A pin 10 is also secured to the lens barrel unit 8. The bar 9 is carried by a frame body (not shown), which is arranged to permit the bar 9 to move straight. The lens barrel unit 8 is thus arranged to be slidable in the direction of a photo-taking optical axis. The pin 10 abuts on a cam 11 which is provided for drawing out the lens barrel unit 8. The lens barrel unit 8 can be drawn out to a desired extent by rotating the cam 11. With the camera arranged in this manner, the lens barrel unit 8 is arranged to retreat to a photographing preparation position after the lens barrel unit 8 is drawn out to a predetermined drawn-out position on the front side of a camera body from a state of being stowed within the camera body.

In the case of the camera of this embodiment, the cam 11 is connected to a known focusing driving means. In taking a shot, the lens barrel unit 8 is drawn out by utilizing the motor of the focus adjustment driving means, prior to an exposure, on the basis of a signal from automatic focusing (AF) means which is not shown.

Further, the driving ring 4 has a projection part 4c. The projection part 4c is located to be within a moving range of the bar 9 when the barrier pieces 2 and 3 are in a completely closed state shown in FIGS. 1(A) and 1(B) through a state obtained in the middle of an opening or closing process shown in FIGS. 3(A) and 3(B). On the other hand, the projection part 4c is located to be in a position of retreating away from the moving range of the bar 9 when the barrier pieces 2 and 3 are in a completely open state shown in FIGS. 2(A) and 2(B). Further, when the lens barrel unit 8 is in the drawn-out position, the fore end of the bar 9 is arranged to be located further forward than the projection part 4c of the driving ring 4.

In other words, if the barrier pieces 2 and 3 do not fully open, the bar 9 secured to the lens barrel unit 8 comes to abut on the projection part 4c of the driving ring 4 on the way of drawing out the lens barrel unit 8. In this instance, the projection part 4c serves as a stopper to prevent the lens barrel unit 8 from being drawn out.

Therefore, in a case where the lens barrel unit 8 is found not actually drawn out to the predetermined drawn-out position, the barrier pieces 2 and 3 can be judged to be not completely opened. The drawn-out state (amount) of the lens barrel unit 8 is arranged to be accurately controlled by detecting the rotation angle of the cam 11 by a known detecting device which consists of a pulse plate and a photointerrupter.

Further, the lens barrel frame 1 has an overhung part 1e which is formed in a position not to hinder the movement of the bar 9 and is arranged to hold the projection part 4c to bring the bar 9 to a stop even when the bar 9 comes to abut on the projection part 4c.

Figure 4:
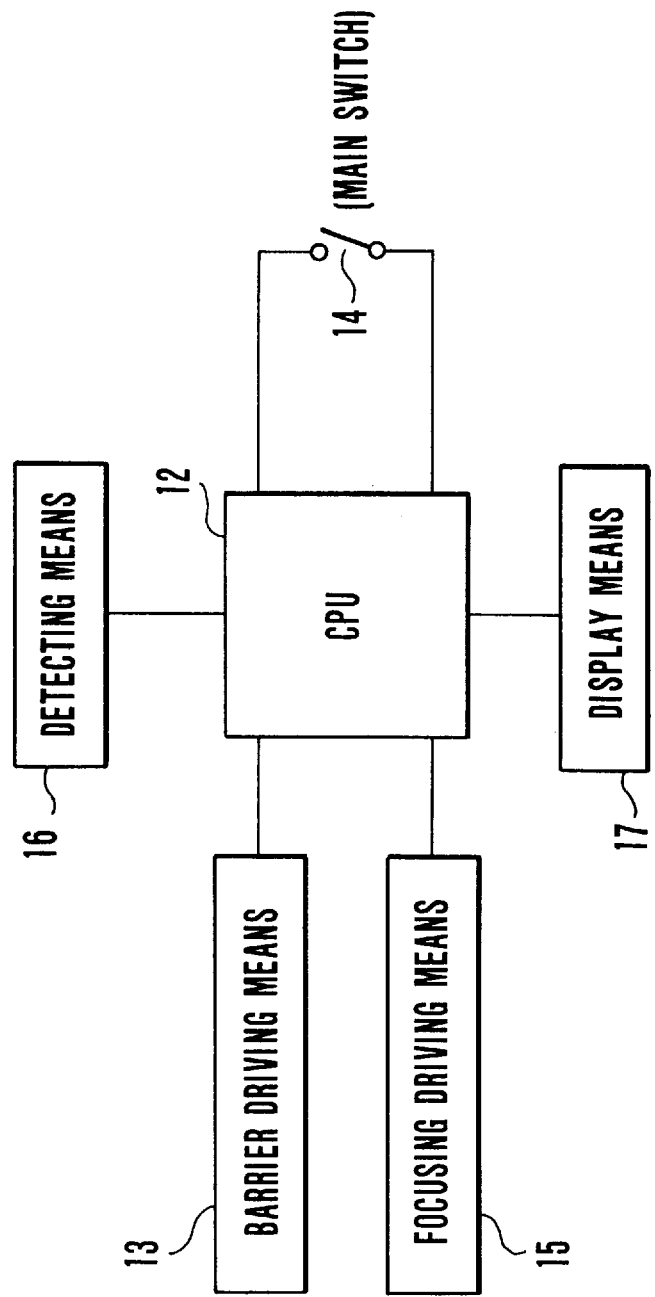
FIG. 4 is a block diagram showing the circuit of the first embodiment of the invention.

FIG. 4 is a block diagram showing a circuit of the camera arranged as the first embodiment. Referring to FIG. 4, a CPU 12 is arranged to control the whole camera. The illustration includes a barrier driving means 13, a main switch 14 of the camera, a focusing driving means 15 for driving the lens barrel unit 8, a detecting means for detecting the position of the lens barrel unit 8, and a display means 17.

When the main switch 14 is turned on, the CPU 12 causes the barrier driving means 13 to open the barrier pieces 2 and 3. Following this, the CPU 12 causes the focusing driving means 15 to drive the lens barrel unit 8 to be drawn out. The detecting means 16 is then caused to detect the drawn-out state of the lens barrel unit 8. In the event of an abnormality of the barrier, the display means 17 displays the abnormality and a shutter release is inhibited. It should be noted that the lens barrel unit 8 is forcibly drawn out up to a nearest focusing position where the lens barrel unit 8 cannot be drawn out unless the barrier pieces 2 and 3 are open.

Figure 5:
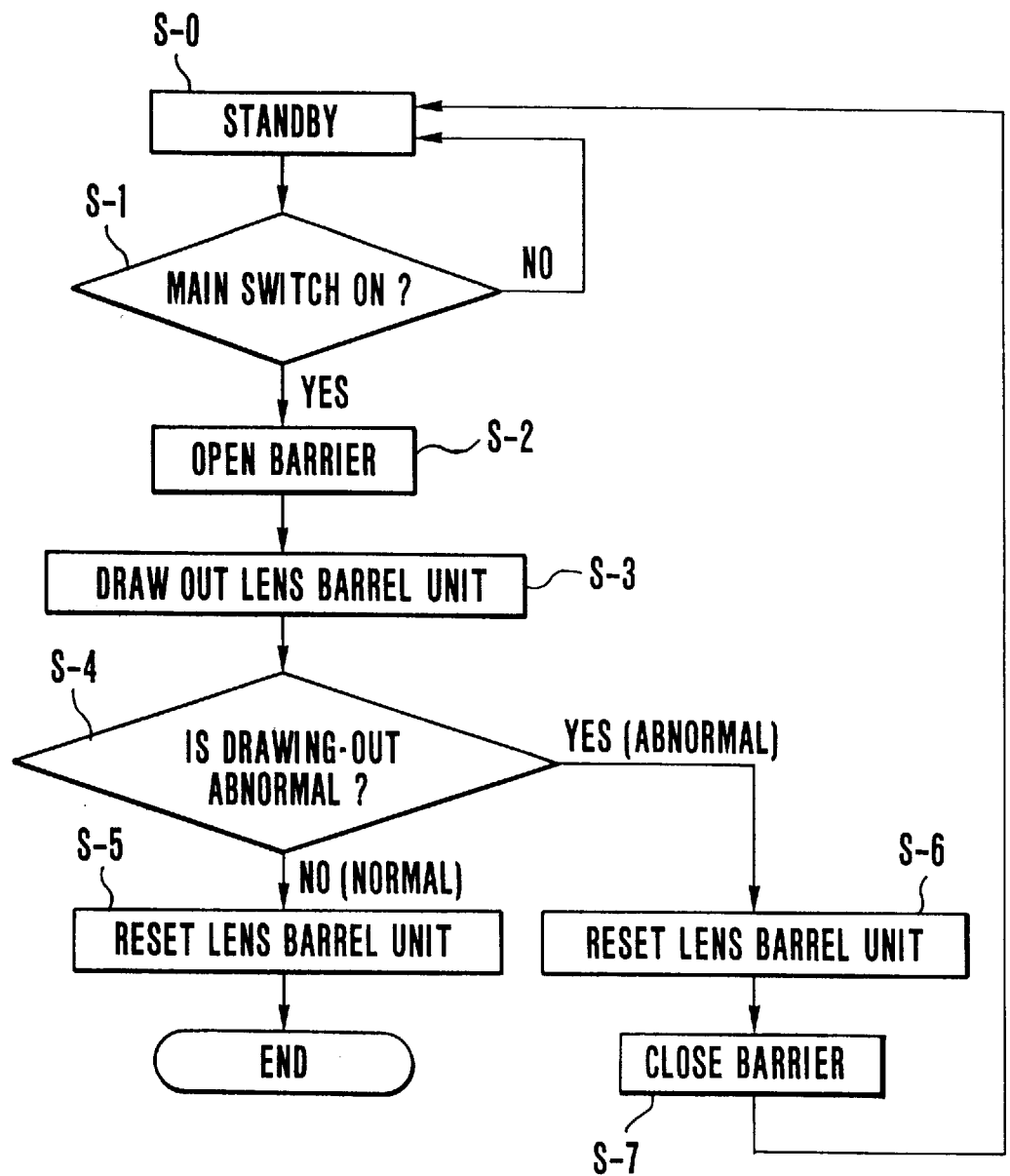
FIG. 5 is a flow chart showing the operation of the first embodiment of the invention.

The detecting operation for the abnormality of the barrier is described below with reference to a flow chart shown in FIG. 5:

At a step S-1, a check is made for the state of the main switch 14. When the main switch 14 is turned on, the flow of operation comes to a step S-2. At the step S-2, the barrier driving means 13 is rendered operative. A restricting force by which the driving ring 4 has been urged to rotate clockwise is canceled to allow the driving ring 4 to be rotated counterclockwise by the force of the spring 7. The barrier pieces 2 and 3 are swung to retreat away from the aperture part 1d of the lens barrel frame 1.

At a step S-3, after a barrier driving signal is outputted, a drawing-out signal is outputted for drawing out the lens barrel unit 8. The focusing driving means 15 then operate. The lens barrel unit 8 is then drawn out toward a predetermined drawn-out position (a specific position on the side of a wide-angle end position).

At a step S-4, after commencement of the drawing-out process on the lens barrel unit 8, a check is made through the detecting means 16 to find if the lens barrel unit 8 is being abnormally drawn out. If not, the flow comes to a step S-5. The bar 9 secured to the lens barrel unit 8 never comes to abut on the projection part 4c of the driving ring 4 when the barrier pieces 2 and 3 are fully open as shown in FIG. 2(A). In this case, the state of drawing-out the lens barrel unit 8 is judged to be normal and the bar 9 moves to a position as indicated by a broken line in FIG. 2(B).

At the step S-5, when the lens barrel unit 8 reaches the predetermined drawn-out position, a lens-barrel-unit reset signal is given to the focusing driving means 15. The focusing driving means 15 then causes the cam 11 to rotate in a reverse direction so as to reset the lens barrel unit 8. The reverse rotation of the cam 11 brings the lens barrel unit 8 back to its reset position. A reset action of the lens barrel unit 8 then comes to an end to complete preparation for taking a shot.

Meanwhile, if the process of drawing-out the lens barrel unit 8 is found to be abnormal at the step S-4, for example, if the barrier pieces 2 and 3 are prevented from swinging on the way by sand, dust or the like, the projection part 4c of the driving ring 4 prevents the movement of the bar 9 in a manner as shown in FIGS. 1(A), 1(B), 3(A) and 3(B). The movement of the lens barrel unit 8 thus come to a stop, although the focusing driving means 15 is working. The detecting means 16 then detects this stop of the lens barrel unit 8 and informs the CPU 12 of the abnormality of the open state of the barrier. Thus, the abnormality of the barrier is indirectly determined by detecting the stopping of the lens barrel unit 8. The display means 17 displays this abnormality. The shutter release of the camera is inhibited. At a step S-6, a reset action is performed on the lens barrel unit 8 under this condition. This reset action is accomplished, like in the case of the step S-5, by the reverse rotation of the cam 11. Upon completion of the reset action on the lens barrel unit 8, the flow comes to a step S-7. At the step S-7, the driving ring 4 is caused by the barrier driving means 13 to rotate clockwise against the spring 7, so that the barrier pieces 2 and 3 are closed. The flow then comes back to a step S-0 at which the main switch 14 is in an off-state.

In most cases where the barrier pieces 2 and 3 stick due to grains of sand or the like, the state of sticking can be corrected by the impinging impact of the bar 9 on the driving ring 4. With the camera thus recovered from the sticking trouble, the normal operation can be resumed by turning the main switch 14 on.

Figure 6:
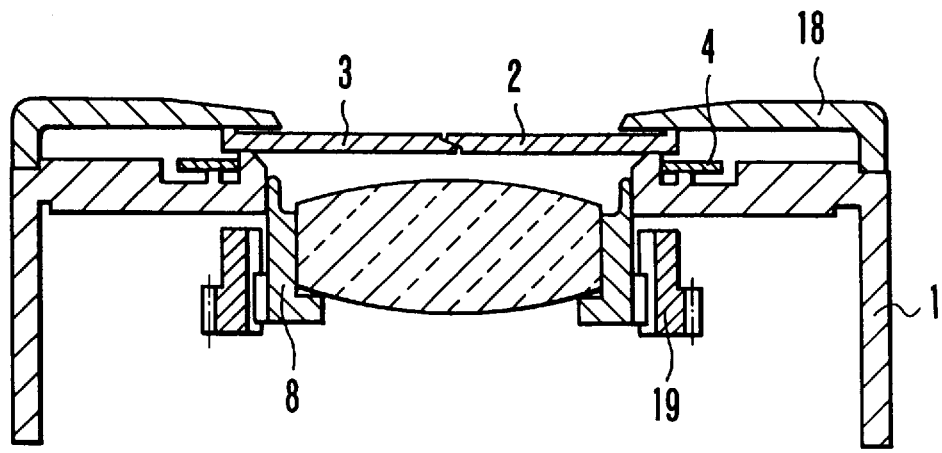
FIG. 6 shows a barrier opening and closing mechanism of a second embodiment of the invention in a state of completely closing a barrier.
Figure 7:
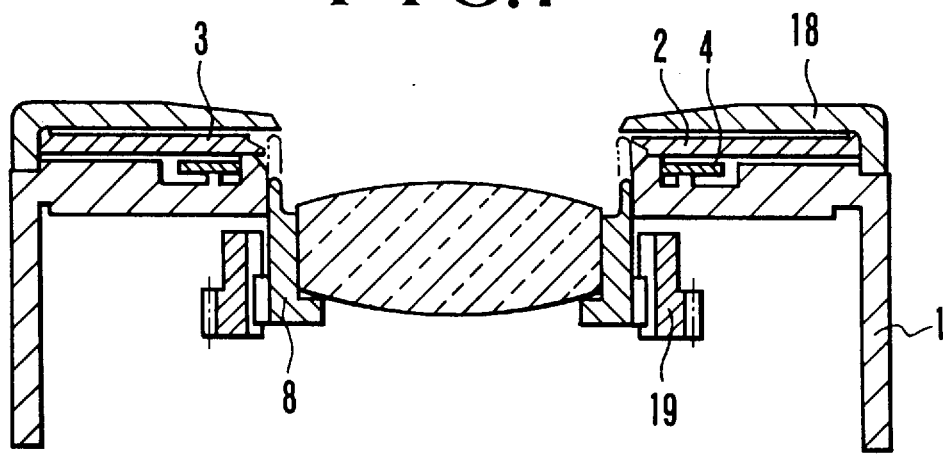
FIG. 7 shows the barrier of the second embodiment of the invention in a fully open state.
Figure 8:
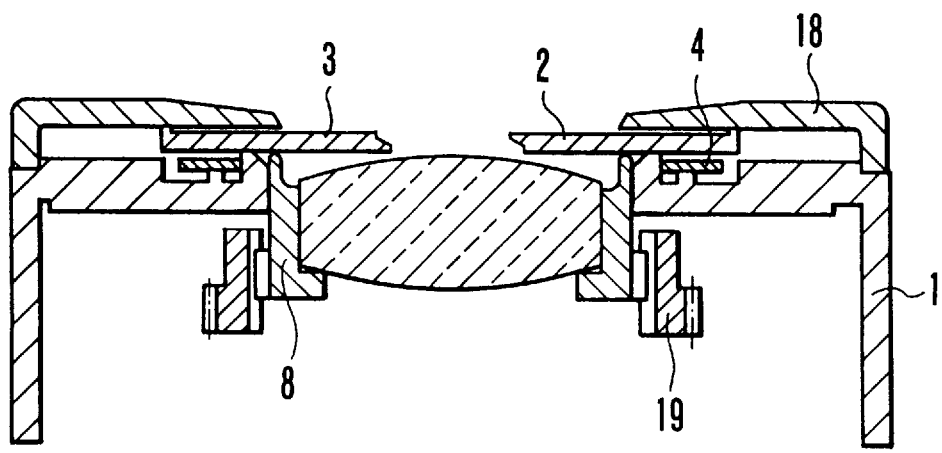
FIG. 8 shows the barrier of the second embodiment in a state obtained in the middle of an opening or closing process.

FIGS. 6, 7 and 8 show a second embodiment of invention. In these drawings, the same component parts as those of the first embodiment described above are indicated by the same reference numerals. The second embodiment differs from the first embodiment in that the lens barrel unit 8 is arranged to be drawn out by means of a helicoid thread arrangement, etc., without using the bar 9. FIG. 6 is a sectional view showing the barrier in a closed state. FIG. 7 is a sectional view showing the barrier in an open state. FIG. 8 is a sectional view showing the barrier in a state of having come to a stop in the middle of an opening or closing process.

Referring to FIGS. 6, 7 and 8, a cover 18 which is arranged to cover the front surfaces of the barrier pieces 2 and 3 is secured to the lens barrel frame 1. A helicoid ring 19 has a helicoid female thread which is formed along its inner circumference and engages a helicoid male thread formed along the outer circumference of the lens barrel unit 8. A gear is formed on the outer circumference of the helicoid ring 19. This gear is in connection with a focusing driving means which is not shown. The lens barrel unit 8 is drawn out when the helicoid ring 19 rotates around the photo-taking optical axis. The flow of operation of the second embodiment is exactly the same as that of the first embodiment described in the foregoing. However, in a case where the barrier pieces 2 and 3 happen to stick during an opening or closing process due to sand or the like, the abnormality of the barrier is detected as the front end of the outer circumference of the lens barrel unit 8 comes into contact directly with the barrier pieces 2 and 3 when the lens barrel unit 8 is drawn out after an opening action of the barrier.

Each of the first and second embodiments is arranged to draw out the lens barrel unit by using the focusing driving means. However, this invention is not limited to this arrangement. A drawing-out mechanism for the lens barrel unit may be separately provided for that purpose.

As described above, an opening action of the barrier and a drawing-out action of the photo-taking optical unit are performed before completion of preparation for taking a shot after the main switch is turned on. If the barrier is inadequately opened by the barrier opening action, the inadequate opening is arranged to be detected as the photo-taking optical unit, in such a case, comes to abut on the barrier or on a barrier driving member, either directly or through a bar-like member provided on the photo-taking optical unit. This arrangement enables the photographer to know without fail the inadequate opening of the barrier in advance of performing a photographing operation.

Figure 10:
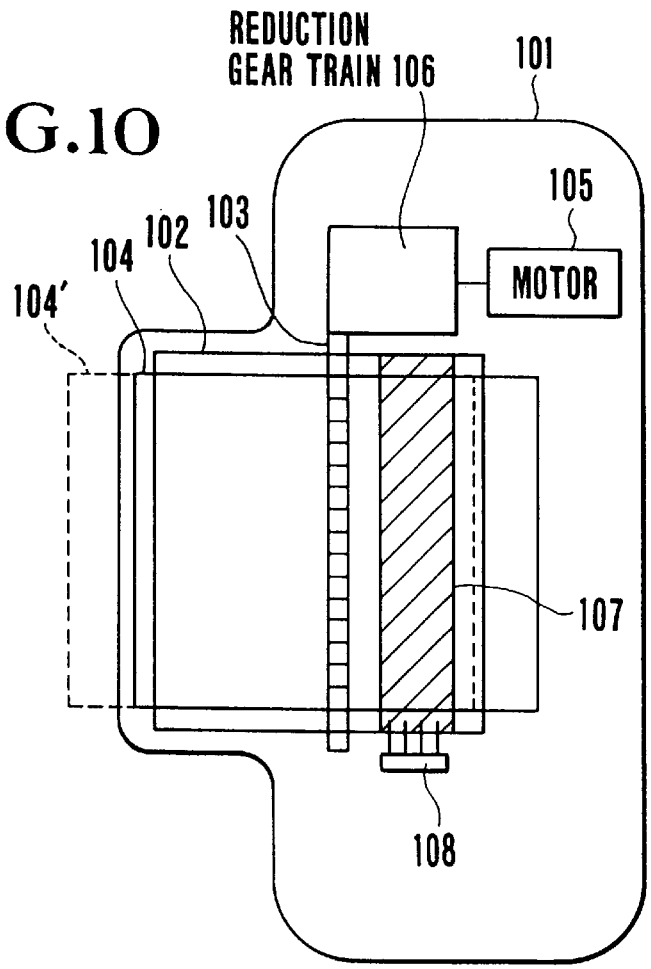
FIG. 10 shows in outline the camera of FIG. 9.

FIG. 10 shows in outline a camera which is arranged according to this invention as a third embodiment thereof. The illustration includes a camera casing 101, a lens barrel cam ring 102, a lens barrel cam gear 103 which is mounted on the lens barrel cam ring 102, and a lens barrel 104 which can be retracted by the rotation of the lens barrel cam ring 102 from a photographing position indicated by a broken line 104' to a position indicated by a full line in FIG. 10. A lens barrel driving motor 105 serves as a drive source for operations on the lens barrel 104. A reduction gear train 106 is arranged to transmit the rotation of the lens barrel driving motor 105 to the lens barrel cam gear 103 while reducing the speed of the rotation. A flexible circuit board 107 is provided for detecting the rotation angle of the lens barrel 104. A lens barrel switch 108 is arranged to detect the position of the lens barrel 104.

Figure 11:
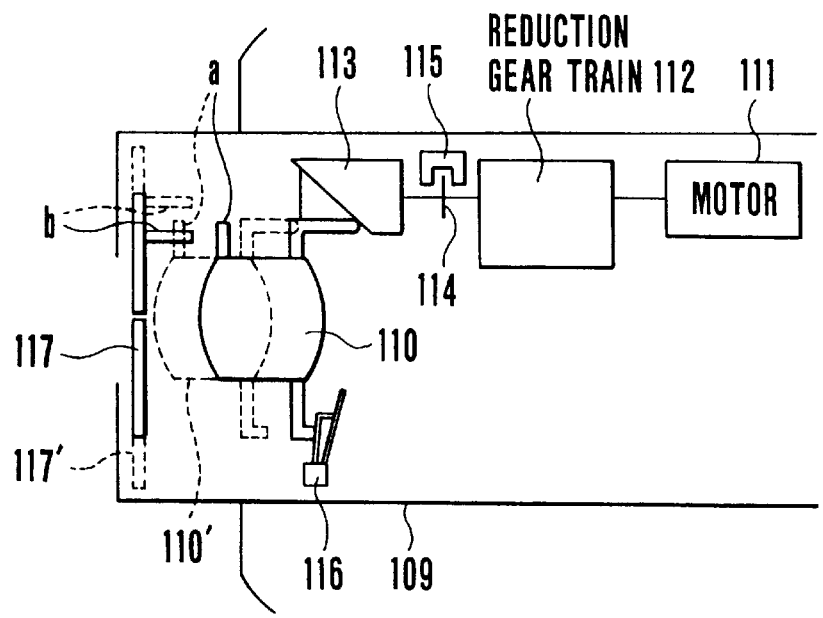
FIG. 11 shows in outline the internal arrangement of a lens barrel of the camera of FIG. 9.
Figure 12A:
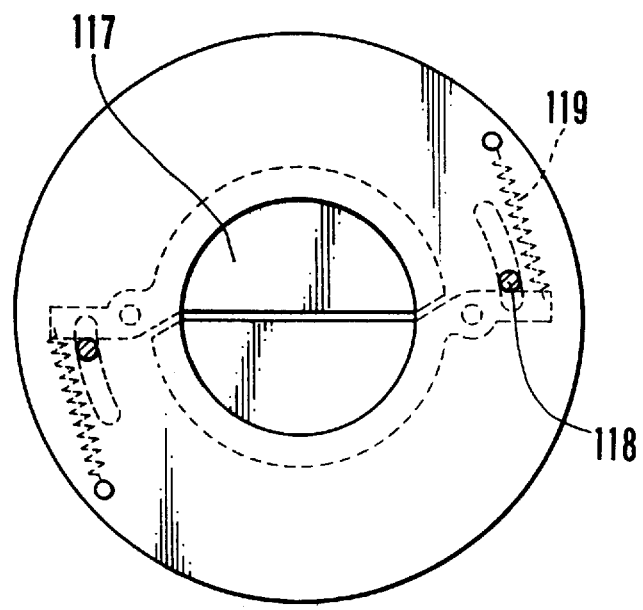
FIGS. 12(A) and 12(B) show the completely closed and fully open states of a barrier as viewed from the front of a lens barrel of the camera of FIG. 9.
Figure 12B:
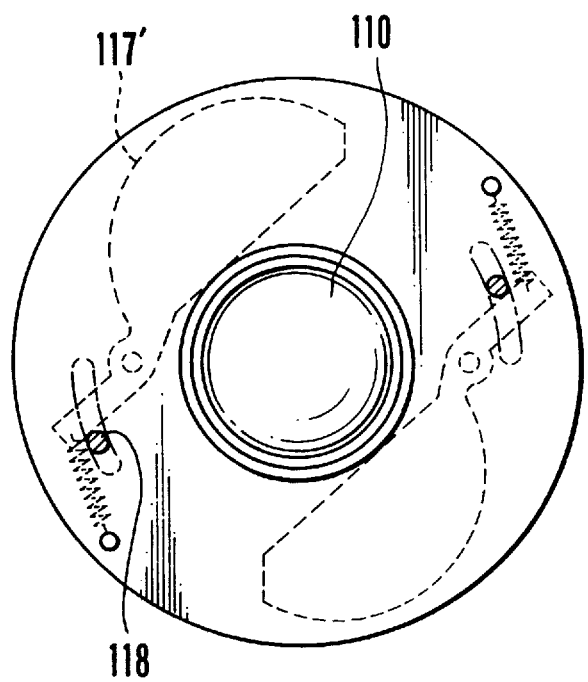

FIG. 11 shows the inside of the lens barrel 104. The illustration includes a lens barrel cover 109. A lens unit 110 is arranged to act for adjusting focus. The lens unit 110 can be drawn out from its initial position indicated by a full line to another position 110' which is indicated by a broken line. A lens motor 111 is arranged to serve as a drive source for the lens unit 110. A lens reduction gear train 112 is arranged to reduce the speed of rotation of the lens motor 111. An AF cam 113 is arranged to draw out the lens unit 110 by receiving the rotation of the lens reduction gear train 112. A pulse plate 114 is arranged to rotate together with the rotation of the AF cam 113. A pulse produced by the pulse plate 114 is detected by a photointerrupter 115. A lens initial position detecting switch 116 detects the initial position of the lens unit 110. The lens initial position detecting switch 116 is arranged to limit the amount of drawing-out of the lens unit 110 according to a number of pulses counted from the start of counting the pulses obtained from the pulse plate 114 and the photointerrupter 115. A barrier 117 is arranged to open from a closed position which is shown by full lines to an open position which is shown by broken lines 117'. Referring to FIGS. 12(A) and 12(B), a barrier opening and closing lever 118 is arranged to act in association with the lens barrel cam ring 102 and to open or close the barrier 117 by an urging force of a spring 119. FIG. 12(A) shows the barrier 117 in a closed state. FIG. 12(B) shows the barrier 117 in an open state. Other functions of the camera are omitted from description for the sake of simplification of description as they are irrelative to this invention.

FIG. 13 is a block diagram showing the electric circuit of the camera arranged according to this invention as the third embodiment. Referring to FIG. 13, a main switch 120 is provided for rendering the camera operative. A lens initial position detecting means 121 has the lens initial position detecting switch 116. A lens driving means 122 includes a motor driver (not shown) and the lens motor 111. A lens position detecting means 123 includes the pulse plate 114 and the photointerrupter 115 shown in FIG. 11. A lens barrel position detecting means 124 has the lens barrel switch 108 and is arranged to read the rotation angle of the lens barrel cam ring 102 by having the lens barrel switch 108 in sliding contact with a pattern provided on the flexible circuit board 107. The position of the lens barrel 104 which moves along with the cam of the lens barrel cam ring 102 is detected by reading this rotation angle. A lens barrel driving means 125 includes a motor driver (not shown) and the lens barrel driving motor 105. A microcomputer 126 is arranged to control the operation of the camera.

Figure 9:
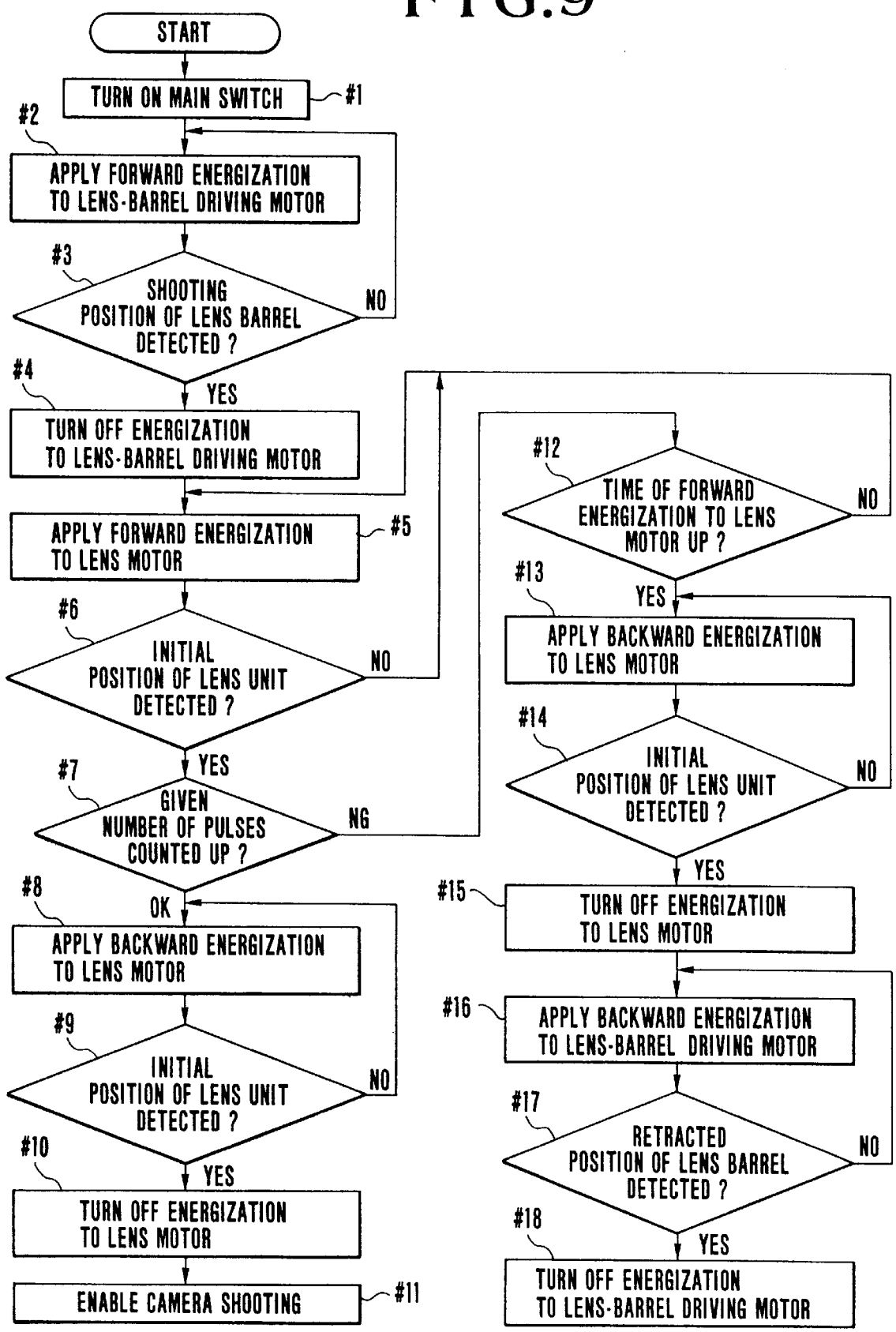
FIG. 9 is a flow chart showing the operation of a camera according to a third embodiment of this invention.

FIG. 9 is a flow chart showing the flow of operation of the camera which is arranged as described above as the third embodiment of this invention. The operation is described referring to FIG. 9 as follows:

At a step #1, the microcomputer 126 receives a signal indicating that the main switch 120 is turned on. At a step #2, a forward energization is applied to the lens barrel driving motor 105 to have the lens barrel 104 drawn out. At a step #3, the forward energization to the motor 105 is allowed to continue until the lens barrel 104 is found to have reached a wide-angle position by the lens barrel position detecting means 124. Upon detection of the lens barrel 104 having reached the wide-angle position, the flow comes to a step #4 to turn off the energization to the motor 105. At this time, the barrier opening and closing lever 118 which is interlocked with the lens barrel cam ring 102 is caused to open the barrier 117. At a step #5, a forward energization is applied to the lens motor 111 to perform a focusing (focus adjusting) action by drawing out the lens unit 110. At a step #6, the lens initial position switch 116 of the lens initial position detecting means 121 detects that the lens unit 110 begins to be drawn out. At a step #7, a pulse counting action is performed after detection of the initial lens position by using the pulse plate 114 and the photointerrupter 115 to detect thereby the current lens position. With the pulse count performed in this manner, the energization to the lens motor 111 is allowed to continue until a given number of pulses are counted up at a step #12. Then, the opening or closing state of the barrier 117 resulting from the process of drawing out the lens unit 110 is detected by counting a given number of pulses. In a case where the lens unit 110 is drawn out with the barrier 117 in an open state, a part "b" (see FIG. 11) of the barrier 117 escapes the moving path of a part "a" of the lens unit 110 as the barrier 117 is open. Therefore, a given number of pulses are counted up at the step #7 to allow the lens unit 110 to be drawn out to a given amount. If the barrier 117 is in a closed state, the part "b" of the barrier 117 remains on the moving path of the part "a" of the lens unit 110. In that instance, therefore, the part "a" comes to hit the part "b" during the process of drawing out the lens unit 110. The action of the lens unit 110 then comes to a stop and the rotation of the pulse plate 114 also comes to a stop. Under this condition, even if the energization to the lens motor 111 has been allowed to continue a given period of time at the step #12, the result of a check made at the step #7 for completion of the pulse count turns out to be no good (NG). The open or closed state of the barrier 117 is checked by finding whether the result of the check made at the step #7 for the count of the given number of pulses is OK or NG. If the barrier 117 is found to be in an open state with the given number of pulses counted up at the step #7, the flow comes to a step #8 to apply a reverse energization to the lens motor 111. At a step #9, a check is made to find if the initial position of the lens unit 110 is detected. If so, the flow comes to a step #10 to turn off the energization to the lens motor 111. At a step #11, the camera is made ready for photographing.

Next, in a case where the barrier 117 is closed, no pulse is obtained, although the flow of operation waits for the count-up of the given number of pulses at the step #7. In this case, therefore, the time of the normal energization to the lens motor 111 expires at the step #12. The flow then comes to a step #13 to apply a reverse energization to the lens motor 111. At a step #14, a check is made for the initial position of the lens unit 110. If the lens unit 110 is found to be back in its initial position, the flow comes to a step #15 to turn off the energization to the lens motor 111. Then, since the barrier 117 is in its closed state and the lens barrel 104 does not have to be in a protruding state, the lens barrel 104 is moved back to its retracted position. At a step #16, a reverse energization is applied to the lens barrel driving motor 105. At a step #17, a check is made until the lens barrel 104 comes to its retracted position. When the lens barrel 104 is retracted, the flow comes to a step #18 to turn off the energization to the lens barrel driving motor 105.

The camera of the third embodiment is arranged to make a check for the open or closed state of the barrier by driving the lens, as mentioned above, so that the photographer can be saved from taking a faulty shot when the barrier is in a closed state and also can be promptly informed of the abnormal state of the camera.

A fourth embodiment of the invention is arranged as shown in FIGS. 14 to 17. In this case, the invention is applied to a camera of the kind having a viewfinder device arranged to permit viewing, in a non-inverted erecting shape, an object image formed by a visual field light flux guided to a viewfinder screen through a photo-taking lens (not shown) and a movable reflection mirror 204. The viewfinder device includes a roof mirror 201 which consists of first and second mirrors and is arranged to reflect the object image passing through a viewfinder screen 203 obliquely forward and also to right and left, a front reflection mirror 202 which guides the image reflected by the roof mirror 201 toward an eyepiece located in the rear along the surface of the viewfinder screen 203, and a moving means for selectively displacing the front reflection mirror 202 and the viewfinder screen 203 either to an object-image viewing position where they form a given angle relative to a ridge line part of the roof prism 201 or to a stowed position where they are folded into a stowed state.

Figure 14:
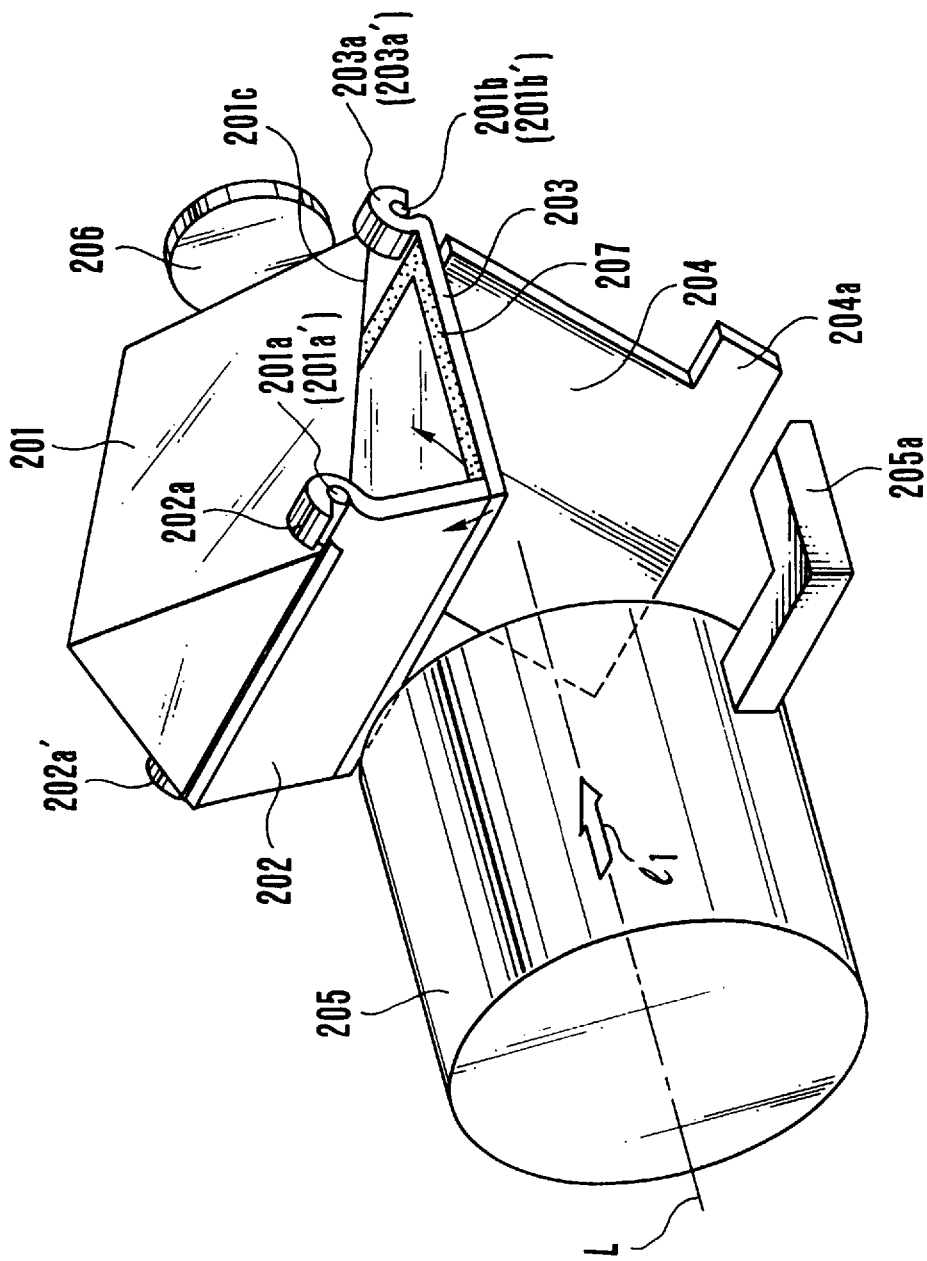
FIG. 14 is an oblique view showing, in a photographing state, a foldable-type pentagonal roof reflection arrangement of a camera arranged according to this invention as a fourth embodiment thereof.
Figure 15:
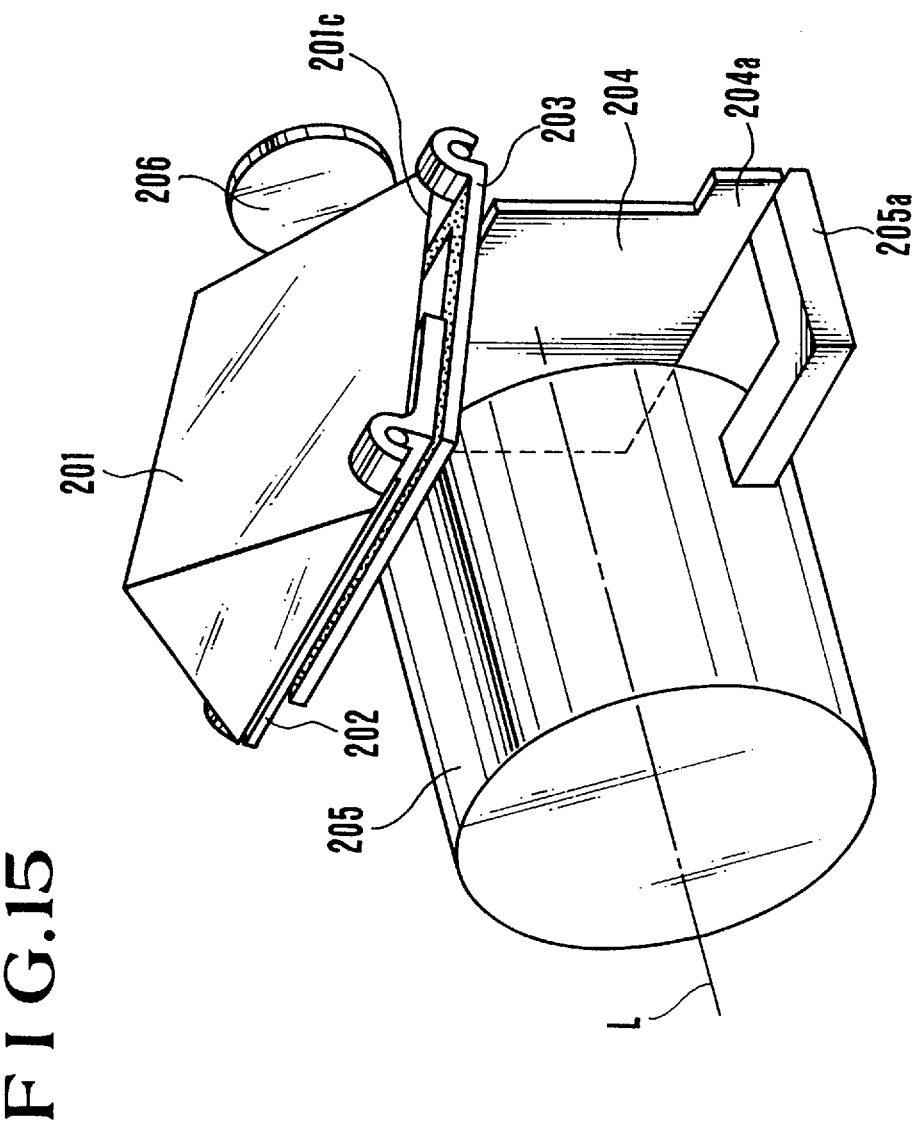
FIG. 15 is an oblique view showing the same pentagonal roof reflection arrangement of FIG. 14 in a state obtained when a lens barrel is retracted.

The fourth embodiment is described with reference to FIGS. 14 to 17 as follows:

Two pairs of shaft parts 201a, 201a', 201b and 201b' are formed in one body with the roof mirror 201 which consists of the first and second mirrors. Each pair of the shaft parts 201a and 201a' or 201b and 201b' are disposed on the same axis on each of two sides of the roof mirror 201. The front reflection mirror 202 is provided with U-shaped connection parts 202a and 202a' which are formed in one body with the front reflection mirror 202 and are arranged to be elastically hooked on the shaft parts 201a and 201a', so that the front reflection mirror 202 is swingable around the axis of the shaft parts 201a and 201a'. The viewfinder screen 203 has a Fresnel lens on its lower surface side. The upper surface side of the viewfinder screen 203 is conjugate with the surface of the film and is provided with a field frame 207. Further, the upper surface of the viewfinder screen 203 is in a mat-like state having a diffusibility. Like the front reflection mirror 202, the viewfinder screen 203 has U-shaped connection parts 203a and 203a' which are formed in one body with the viewfinder screen 203 and are arranged to be elastically hooked on the shaft parts 201b and 201b', so that the viewfinder screen 203 is swingable around the axis of the shaft parts 201b and 201b'. The front reflection mirror 202 and the viewfinder screen 203 are selectively displaceable either to the object-image viewing position where they form a given angle between them as shown in FIG. 14 or to the stowed position where they are folded into a stowed state as shown in FIG. 15. In the stowed state, the front reflection mirror 203 and the viewfinder screen 203 are swung to a position where they are nearly in parallel with a ridge line part 201c of the roof mirror 201. When the camera is in a photographable state, a lens barrel 205 and a movable mirror 204 are disposed adjacent to a viewfinder system which is arranged as described above.

Figure 16:
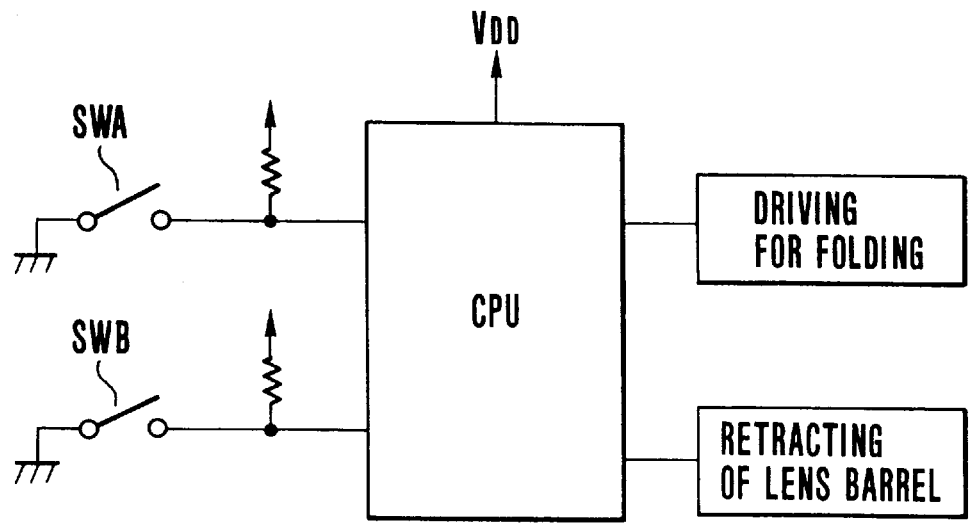
FIG. 16 is a circuit diagram showing in outline a driving circuit of the camera of FIG. 14 which is used when the lens barrel is retracted.
Figure 17:
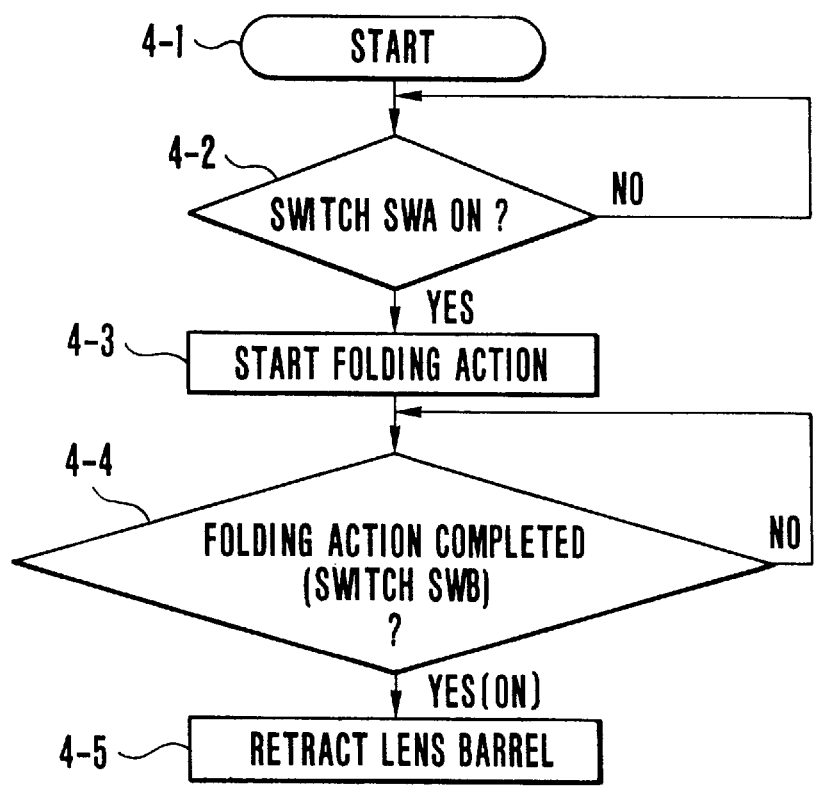
FIG. 17 is a flow chart showing a retracting operation of the lens barrel in the camera shown in FIG. 14.

The retracting operation of the lens barrel is described below referring to FIGS. 16 and 17:

When a power supply switch (not shown) is turned off, a routine which is shown in FIG. 17 starts at a step 4-1. A switch SWA which is shown in FIG. 16 is turned on. At a step 4-2, a check is made for the state of the switch SWA. With the switch SWA found to be turned on, the flow comes to a step 4-3 to initiate a folding action on the front reflection mirror 202 and the viewfinder screen 203. When the folding action is completed at a step 4-4, another switch SWB also shown in FIG. 16 is turned on. Then, at the step 4-5, the lens barrel 205 begins to move along an optical axis L in the direction of an arrow 11 as shown in FIG. 14. During the process of this movement, an arm part 205a which is in one body with the lens barrel 205 pushes a projection part 204a of the movable reflection mirror 204. The lens barrel 205 comes to a stop after moving a given distance. The retracting operation of the lens barrel 205 then comes to an end in a state as shown in FIG. 15.

Figure 18:
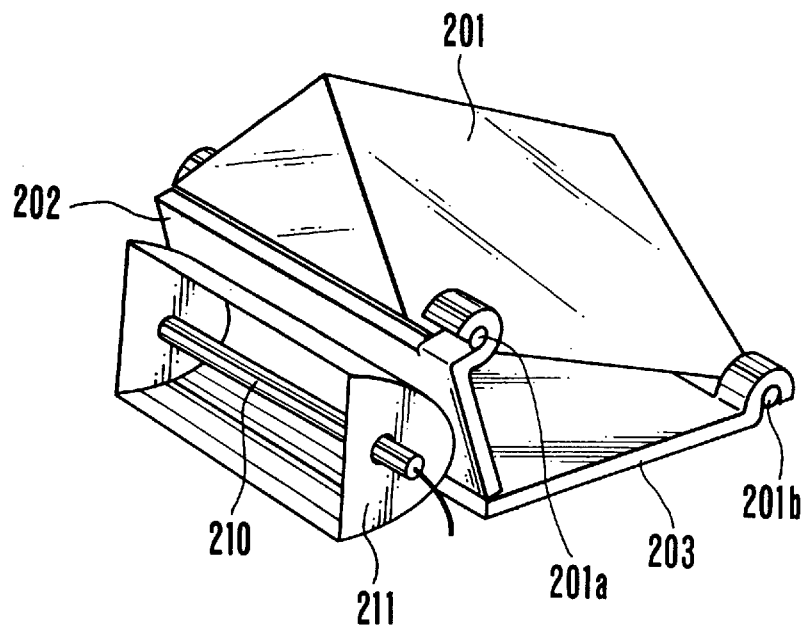
FIG. 18 is an oblique view showing a viewfinder and a flash device in their states obtained when a camera arranged according to this invention as a fifth embodiment thereof is in its operating state.
Figure 19:
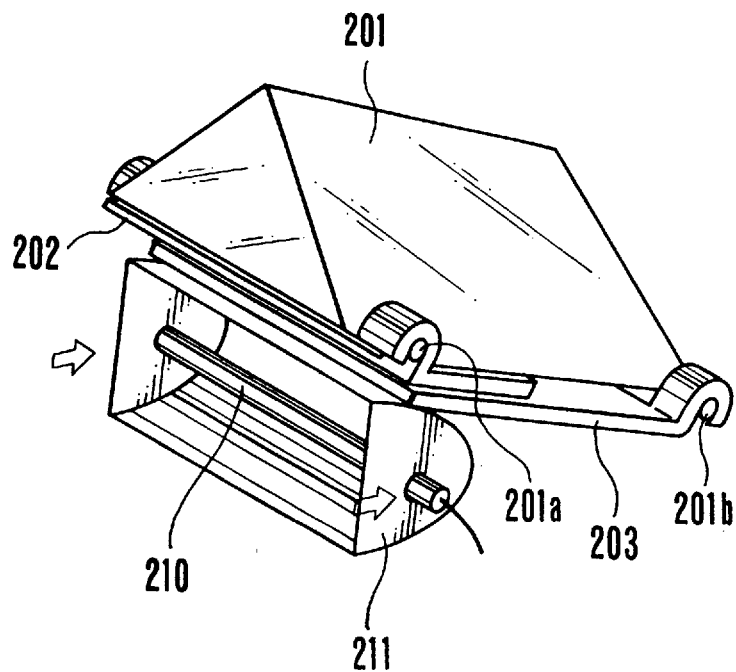
FIG. 19 is an oblique view showing the viewfinder and the flash device in their states obtained when the camera of the fifth embodiment is in its non-operating state.

FIGS. 18 and 19 show a fifth embodiment of this invention. The fifth embodiment is described with reference to FIGS. 18 and 19 as follows. A flash part is composed of a xenon lamp 210 and a reflector 211. FIG. 18 shows a viewfinder device in a state obtained when the camera is in an operating state with the flash part pushed forward. In the same manner as in the case of the fourth embodiment, a front reflection mirror 202 and a viewfinder screen 203 are arranged to be swingable around shaft parts 201a and 201b, respectively. In operating the camera, the front reflection mirror 202 and the viewfinder screen 203 are unfolded and the flash part is pushed forward as shown in FIG. 18. When the camera is not operated, the front reflection mirror 202 and the viewfinder screen 203 are folded to make a space, in which the flash part is stowed as shown in FIG. 19.

In the case of the camera arranged as the third embodiment described in the foregoing, the open or closed state of the barrier is detected by driving the lens. The third embodiment thus eliminates the possibility of taking a faulty shot with the barrier in a closed state and also promptly enables the photographer to know the abnormality of the camera.

In accordance with the arrangement of the fourth embodiment described above, the camera can be arranged in smaller size and lighter weight than the conventional camera of the kind using a pentagonal roof prism. The lens barrel can be adequately retracted irrespective of the external shape of the lens barrel. The portability of the camera can be enhanced by compactly arranging it.

In the case of the fifth embodiment, the arrangement described permits the camera to have a compact external shape, because the flash part can be stowed inside of the camera body when the flash part is not used.

What is claimed is:

1. A camera to which an optical unit and a protection cover for the optical unit are applied, the camera comprising:
   (a) an opening mechanism for opening said protection cover in association with turn-on of a main switch,
   (b) drive device for driving said optical unit in a direction of projection,
   (c) a detection device for detecting an actual movement amount of said optical unit driven by said drive device, and
   (d) a determination device for determining whether the opening operation of said protection cover is normal or abnormal on the basis of detection results of said detection means, wherein said drive device drives in a reverse direction to drive said optical unit in a direction of storage when said determination device determines the opening operation is abnormal.

2. A camera according to claim 1, further comprising an indication device for indicating when said determination device determines the opening operation is abnormal.

3. A camera according to claim 1, wherein said determination device determines the opening operation is abnormal when the actual movement amount of said optical unit is less than a predetermined amount.

4. A camera according to claim 1, wherein said opening mechanism prevents the movement of said optical unit in the direction of projection when said protection cover is not in a opening state.

5. A camera according to claim 1, wherein said drive device has a cam member and drives said optical unit in the direction of projection by rotating said cam member in a first direction, and drives said optical unit in the direction of storage by rotating said cam member in a second direction reverse to the first direction.

6. A camera according to claim 4, wherein said optical unit has a guide bar movable with said unit and said guide bar contacts said protection cover to prevent the movement of said optical unit in the direction of projection when said protection cover is not in an opening state.

7. A camera according to claim 1, further comprising a control device for inhibiting exposure operation when said determination device determines the opening operation is abnormal.

* * * * *

UNITED STATES PATENT AND TRADEMARK OFFICE
CERTIFICATE OF CORRECTION

PATENT NO. : 5,892,998
DATED : April 6, 1999
INVENTOR(S) : Takanori Kodaira, et al.

It is certified that error appears in the above-identified patent and that said Letters Patent is hereby corrected as shown below:

Column 5, line 58, delete "operate" and insert --operates--.
Column 6, line 16, delete "on" and insert --all--.

Signed and Sealed this

First Day of February, 2000

*Attest:*

Q. TODD DICKINSON

*Attesting Officer*      *Acting Commissioner of Patents and Trademarks*